Dec. 6, 1938.　　　D. T. GUNDERSEN　　　2,138,965
METHOD FOR MEASURING THE MAGNETIC PROPERTIES OF METAL
SHAPES OF COMMERCIAL SIZES AND APPARATUS THEREFOR
Filed Aug. 17, 1933　　　7 Sheets-Sheet 1
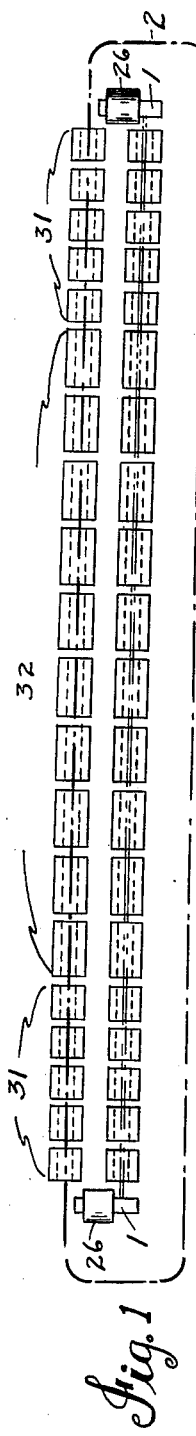
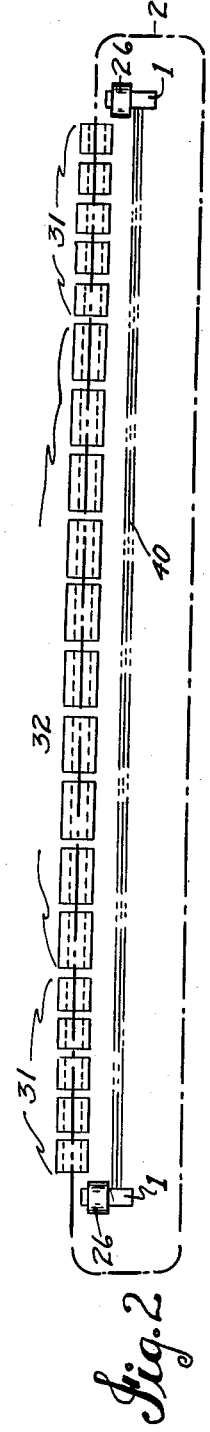
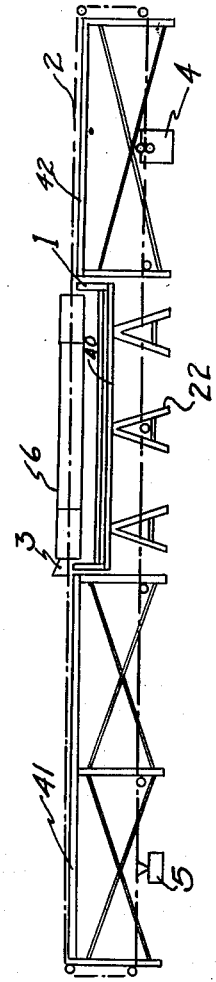

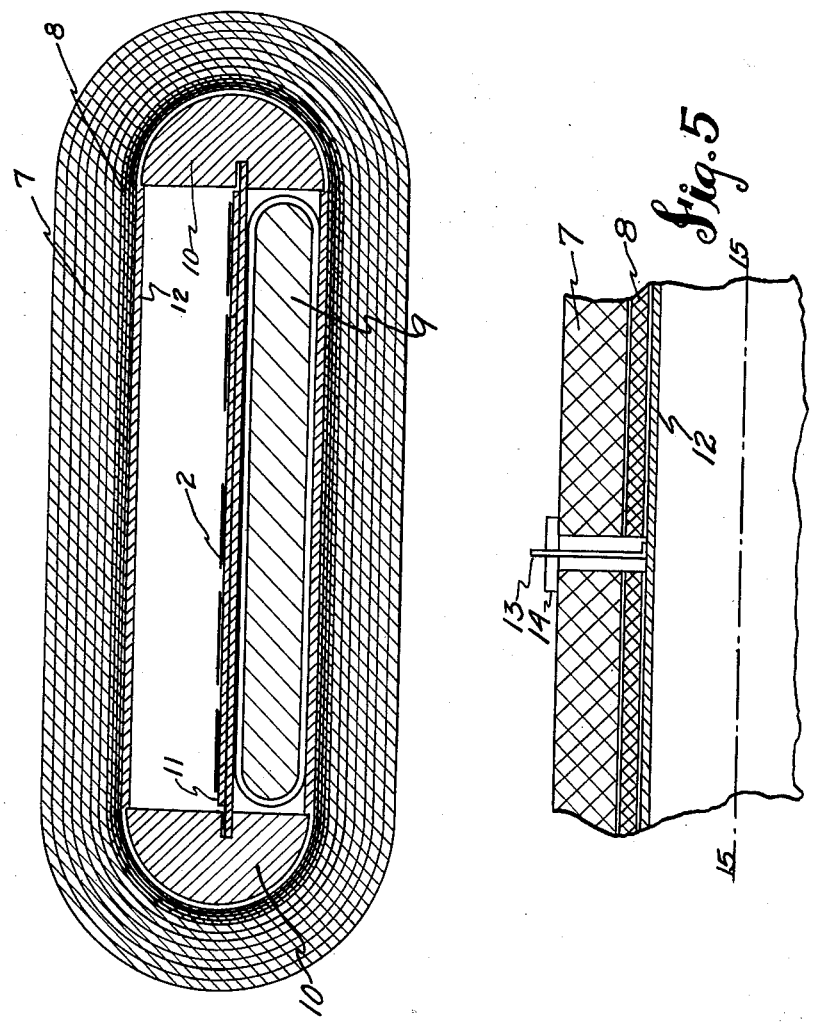

Dec. 6, 1938.  D. T. GUNDERSEN  2,138,965
METHOD FOR MEASURING THE MAGNETIC PROPERTIES OF METAL
SHAPES OF COMMERCIAL SIZES AND APPARATUS THEREFOR
Filed Aug. 17, 1933  7 Sheets-Sheet 3

INVENTOR.
Daniel T. Gundersen
BY Allen & Allen
ATTORNEYS.

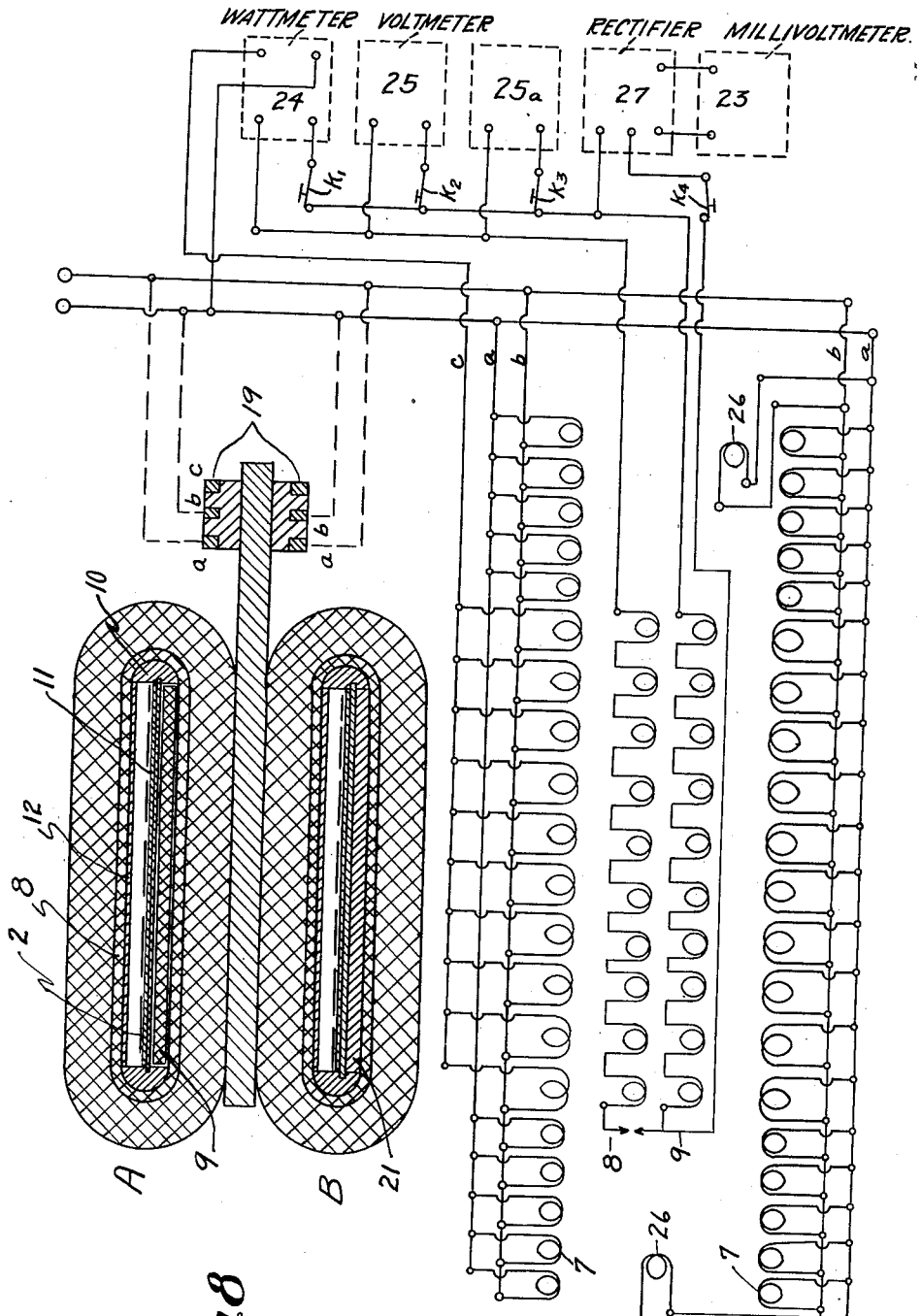

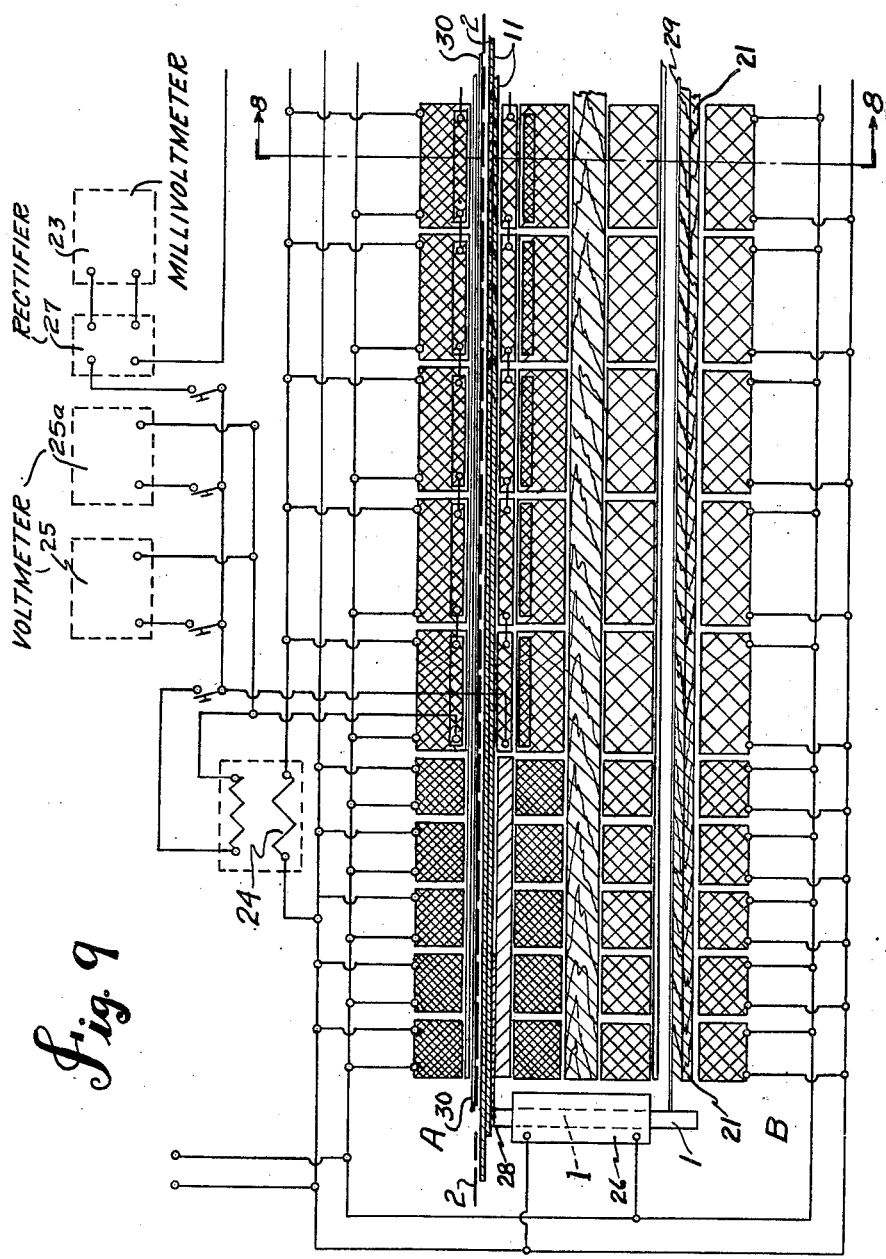

Dec. 6, 1938.   D. T. GUNDERSEN   2,138,965
METHOD FOR MEASURING THE MAGNETIC PROPERTIES OF METAL
SHAPES OF COMMERCIAL SIZES AND APPARATUS THEREFOR
Filed Aug. 17, 1933   7 Sheets-Sheet 6
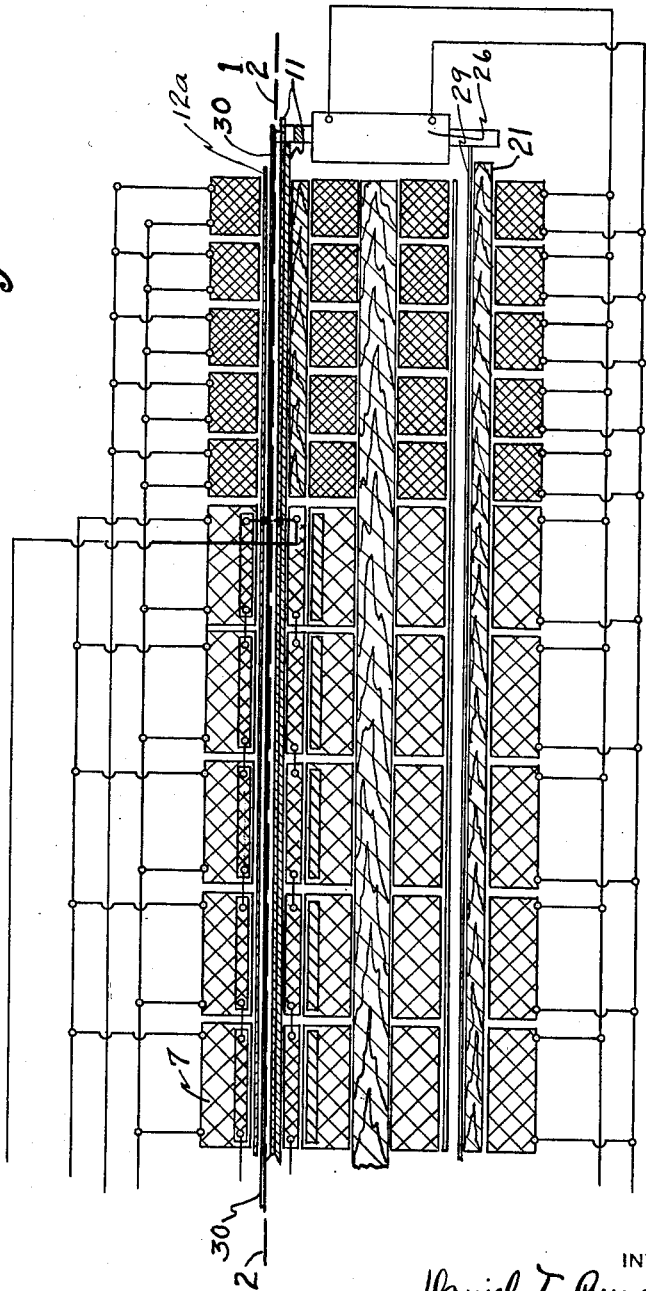

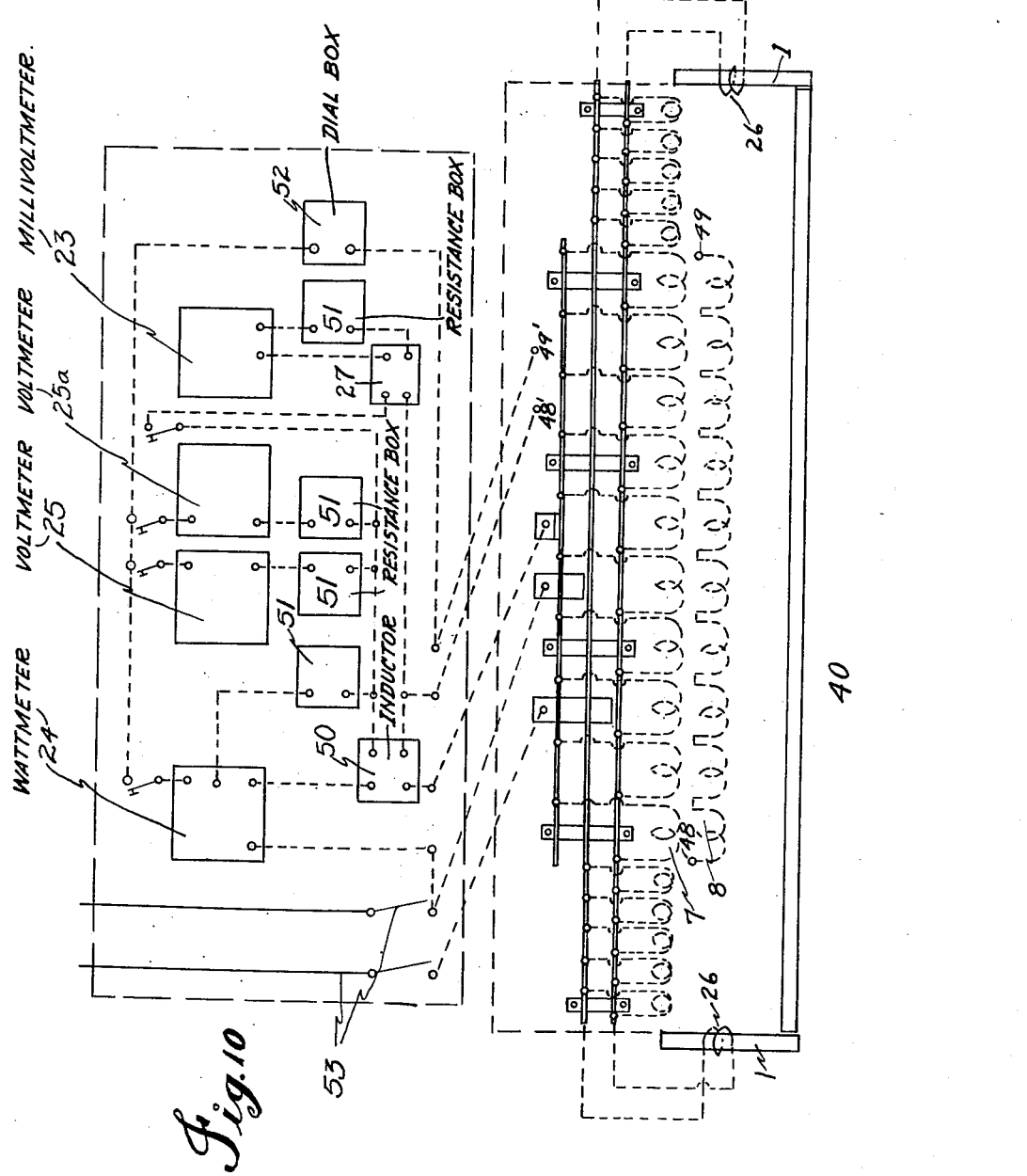

Patented Dec. 6, 1938

2,138,965

UNITED STATES PATENT OFFICE 2,138,965

METHOD FOR MEASURING THE MAGNETIC PROPERTIES OF METAL SHAPES OF COMMERCIAL SIZES AND APPARATUS THEREFOR

Daniel T. Gundersen, Middletown, Ohio, assignor to The American Rolling Mill Company, Middletown, Ohio, a corporation of Ohio Application August 17, 1933, Serial No. 685,655

6 Claims. (Cl. 175—183)

My invention has for one of its objects the provision of a method for measuring the magnetic properties of metal shapes of commercial sizes, such as sheets, strips, bars, rods, wire, rails, etc., as they come from the rolling mill or finishing mill and are ready for shipping to the consumer. Whereas, the following description pertains chiefly to the testing of electrical steel sheets, it will be obvious that by suitable changes in the dimensions of the apparatus described below the above mentioned shapes are readily tested for their magnetic properties.

The usual method heretofore used in grading and testing metal shapes is to choose at random samples from which test pieces are prepared of dimensions suitable for standard testing equipment.

In the case of electrical sheet steel the usual method is to choose at random, two or more of the sheets from a lot, the number chosen depending on the size of the lot. These sheets are then sheared into small strips, say 3 cm. by 50 cm. and are tested for permeability in a permeameter, and then tested for core loss in a separate apparatus such as the Epstein tester which is well known in the art. The sheet metal from which these strips are taken is of course scrapped since it is no longer of commercial size, and the strips themselves after the tests are also scrapped.

The usual method has numerous disadvantages among which are the following: the preparation of the sample strips by which the actual test is made consumes a great amount of time, and requires hand labor; it is wasteful of material, and unless a great amount of extra work is expended in reannealing these test strips after they have been cut into samples and before the testing, the results of the tests will be affected by the influence of the mechanical strains produced in the strips by the shearing, which effect is intensified by the small size of the strips.

One of the objects of my invention is to provide a method of testing the sheets themselves thus obviating the above disadvantages of the old method and also producing a method which has numerous decided advantages over the prior methods heretofore practiced. While one of the greatest advantages of my method is the economic benefit of testing the whole sheet without impairing or destroying it, there are numerous other advantages among which is the possibility of sorting lots of steel sheets which have become accidentally mixed, of sorting out especially fine sheets for special orders, and of testing more sheets per lot to insure closer grading, which results in a more uniform market product. By the testing of all, or even of a large number of the sheets in a lot instead of a selected few, the quality of the lot will be insured; and my method will also assist the manufacturer to establish statistical control of his processes and product.

The problem of testing sheets of commercial sizes would be relatively simple, if electrical steel sheets were homogeneous and uniform entities; but they are not. Every sheet differs to a small degree at least from every other sheet in length, width, gauge and magnetic properties and quality. Length and width can be controlled within reasonable limits and present no great difficulties. The variation in gauge from sheet to sheet of the same gauge number makes it necessary, for accurate results, to weigh every sheet before testing. The main difficulty is the large ratio of width to gauge, and especially the smallness of the gauge itself.

In order to obtain an accurate core loss test at a given frequency, it is desirable that the portion of the sample being tested be uniformly magnetized to the desired induction, that the form of the impressed voltage wave be a sine wave, and that no air space be included between the sample being tested and the primary and secondary windings surrounding it. Such ideal conditions are, of course, not obtainable and compromise or equivalent conditions must be substituted.

The first requirement is easily met in practical testing, if a uniform gauge within the test sheet is assumed. The second requirement is always desirable but not necessary for accurate core loss tests. G. Camilli has shown (J. A. I. E. E., October 1926, pp. 989–995—"A Flux Voltmeter for Magnetic Tests") that accurate core loss for a sample can be measured with voltage waves other than a sine wave, provided the voltage wave induced in the secondary test winding by the magnetic flux of the sample passes through zero only twice per cycle. The correct flux density for the sample is set by the flux voltmeter described by Camilli and the core loss for the sample corrected for error in eddy current loss by the formula:—

$$\text{True core loss} = \frac{\text{Observed loss} \times 100}{H - KE}$$

where $H = \%$ hysteresis loss previously determined for the class of material under test.

$E = \%$ eddy current loss $= (100\text{-}H)$ $$K = \frac{(\text{Flux voltmeter reading})^2}{(\text{r. m. s. voltmeter reading})^2}$$

The third requirement, of no air space between the sample and the secondary winding, can be met (especially in sheet testing) only by a compensation device.

If Camilli's method for determining the flux density in the sample and for correcting eddy current losses is used, the practical requirements for an accurate core loss test are that the portion of the sample being tested be uniformly magnetized to the desired induction, that the net voltage induced in the secondary test winding be due to the flux in the sample alone, and that the wave of the net voltage in the secondary test winding pass through zero only twice per cycle.

Permeability is usually measured by a permeameter, a machine that is separate from the core loss testing equipment. It is therefore obvious that if the two, i. e., the core loss tests and the permeability tests, could be made on the same machine and in one operation, the economic saving would be very great.

One of the objects of my invention is the provision of a method and an apparatus which will test metal shapes including sheets of standard commercial lengths, widths, gauges, and magnetic qualities, for both core loss and permeability at all inductions, accurately, speedily, and without injury to either the sheet being tested or the testing equipment.

The present disclosure of my invention deals with the testing of sheets of at least a minimum length, and in a stationary position; but it will be apparent that testing sheets of various lengths and in a continuous procedure, as well as the testing of many other shapes, may be accomplished without in any way departing from the spirit of my invention.

The apparatus for carrying out my invention generally consists of a tester as hereinafter described, two voltmeters, a wattmeter, an inductor, a frequency meter, together with a voltage regulator and a source of alternating current of controlled wave form.

The sheet tester described in this specification is designed to produce true test results with minimum or negligible arbitrary corrections. It comprises two solenoids each enclosing a sheet of steel, and suitable end pieces for completing the magnetic circuit between the sheets. The upper of the two solenoid portions or legs of the apparatus contains a primary, a secondary, and a compensation winding; and an endless belt may be used to convey the sheet to be tested into this upper leg. The lower portion or leg has only a primary winding and encloses an auxiliary test sheet or sheets. End pieces connect the test sheet and the auxiliary sheet together and thus a closed magnetic circuit is formed. The primary coils of the solenoids are connected in parallel to insure the same flux in each coil and, in conjunction with the short test-length unit described below, produce greater uniformity of flux throughout the length of the sheet being tested than has heretofore been possible.

In the preferred embodiment which I have illustrated in the drawings and which I shall describe hereinafter, each of the ten center primary coils of the upper leg includes a secondary coil, while the remaining coils in the legs do not. These ten coils in the upper leg constitute the test-length unit. The reason for confining the secondary coils to less than all the primary coils of the upper solenoid is to confine the test to uniform magnetic conditions since the end sections of the sheets are not as suitable for testing, due to the poor joints with the end pieces and the reluctance caused by them. Because of the large air space in the upper leg necessitated by the manner of insertion of the sheets to be tested, the E. M. F. induced in the secondary by the primary tends to be too high and the component of this induced E. M. F. due to the flux in the sheet tends to pass through zero more than twice per cycle. To correct this high E. M. F. in the secondary, I prefer to place a wide compensation coil, (or a number of narrow compensation coils connected in series), in the secondary coils, but not surrounding the test sheet, and connect it or them to the secondary coils in series opposition. This compensation coil (or coils) is cut by a portion of the same flux that induces the extra E. M. F. in the secondary coils, and therefore the proper phase relation is maintained, although the E. M. F. induced in this compensation coil (or coils) retards or reduces the E. M. F. in the secondary coils. The compensation may also be accomplished by an external compensator or inductor as is well known in the art; the same current which flows in the ten center primary coils is caused to flow through the primary of an inductor, producing a flux like that inducing the extra E. M. F. in the secondary; the secondary of this inductor may then serve as the compensation coil in place of the internal compensation coil (or coils) in the secondary.

To prevent the component of induced E. M. F. due to the flux in the test sheet from passing through zero more than twice per cycle, I may apply to the primary winding a suitable distorted voltage wave. I may produce this distorted voltage wave by means of a series of generators giving approximately sine waves of frequencies of 60 cycles and odd multiples thereof, as is well known in the art. (See Bull. Bur. Std. vol. 4, #4, pp. 477–478, Oct. 31, 1907, M. G. Lloyd.) The generators are mounted on the same shaft and their windings connected in series. By exciting each generator to the proper voltage, any desired wave form which involves only odd harmonics may be procured.

Only the current flowing through the ten center primary coils (the test-length unit) of the upper leg passes through the wattmeter. The secondary and the compensation coils which comprise the secondary circuit are connected in the usual manner to the two voltmeters and the potential terminals of the wattmeter. The wattage indicated is the loss occurring in a portion of the sheet, in the upper or test leg, of a length equal to the length covered by these central ten coils. The compensation coil also connects through a knife switch to a rectifier and D. C. millivoltmeter, which is calibrated directly in magnetizing force (H); from the (H) reading and the test induction (B) the permeability is readily calculated.

The only function of the under leg, or the leg holding the auxiliary sheet, together with the end pieces, is to complete the magnetic circuit for the sheet being tested in the upper leg.

Whereas the drawings and description which follow specify a definite number of coils, it is obvious that the number and sizes of coils required in the test section is optional; the number of coils in the end sections is also optional; I find however that for best results the total length of each end section should be at least ten inches and preferably fifteen inches or more. I also find that the number of coils in each end section should be at least three and preferably five or more. For the best results the coil dimensions should be as small as practical and conform to the configuration of the shape under test.

A core loss test is conducted on this apparatus in a manner analogous to that employed with the Epstein tester, which is well known in the art. For a definite illustration let us test a sheet of the following description:

| | | |
|---|---|---|
| Length | inches | 108 |
| Weight | pounds | 11 |
| Density | | 7.5 |
| Cross-sectional area of sheet | sq. cm. | 2.425 |
| Volts for B (induction) =10,000 gausses | volts | 37.8 |
| Volts for B (induction) =14,000 gausses | volts | 52.9 |

An essentially sine wave primary voltage, such as is usually found in commercial power, is usually sufficient for core loss tests below approximately 12 kilogausses induction; the corrections for eddy current losses will obviously be greater, but definite. For accurate core loss tests above approximately 12 kilogausses induction, some control of wave form of the primary voltage is necessary.

The sheet to be tested is placed in the upper leg by means of the conveyor belt. The essentially sine wave primary voltage is adjusted until the average or flux-voltmeter connected to the secondary circuit (secondary plus compensation coils) reads 37.8 volts; the R. M. S. voltmeter is read. The voltmeter circuit is then opened and the potential circuit of the wattmeter closed by knife switches (or this may be done by switches in the meters). The wattmeter is read, corrections are made for instrument losses, and the result divided by the weight in pounds of the ten coil test-length of the test sheet, to obtain the uncorrected loss in watts per pound for the sheet. Correction for eddy current loss is then made by Camilli's method described above.

The core loss test at 14 kilogausses induction is the same as that for 10 kilogausses induction, except that the voltage and wave form of the primary voltage are adjusted until the average or flux voltmeter connected to the secondary circuit reads 52.9 volts; and until the R. M. S. voltmeter connected alternately with it to the secondary circuit reads exactly or slightly greater than 52.9 volts.

In testing for permeability, the following procedure is followed. While obtaining core loss the compensation coil (internal or external) is temporarily connected through a knife switch to a rectifier and the D. C. millivoltmeter whose scale is calibrated directly in magnetizing force (H). Permeability $\mu$ is then calculated by the usual formula:

$$\mu = \frac{B}{H}$$

It is thus seen that all necessary data to calculate both core loss and permeability are obtained in one rapid operation.

Reference will now be made to the drawings which describe my preferred form and a modified or simplified form. It is to be understood that different forms of my preferred types may be made without departing from the spirit of my invention.

Figure 1 is a diagrammatic drawing of the preferred form of the sheet tester.

Figure 2 is a diagrammatic drawing of a simplified form of the sheet tester.

Figure 3 is a side elevation of the simplified form of the sheet tester set up for operation.

Figure 4 is a cross section of the test solenoid of the preferred form of the sheet tester.

Figure 5 is a detailed drawing of one of the strap supports for the top wear board.

Figure 8 is a cross section of the preferred type of sheet tester with a wiring diagram, taken on the section line 8—8 of Figure 9.

Figure 9 is a longitudinal side section of the preferred type of sheet tester, with the wiring diagrammatically shown.

Figure 9a is a continuation of Figure 9.

Figure 10 is a wiring diagram for the simpler modification of the sheet tester.

Figure 6:
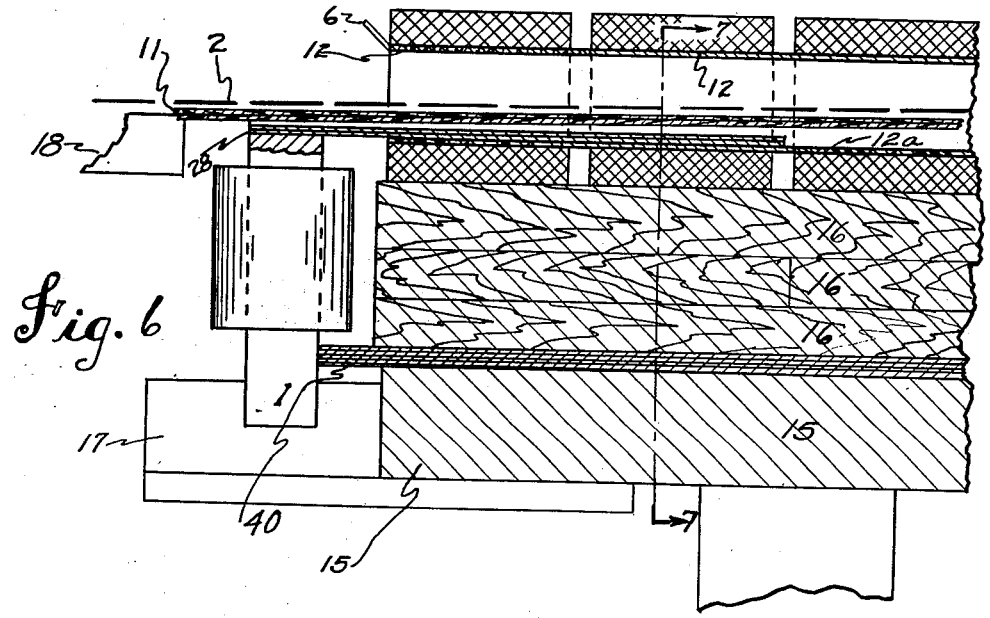
Figure 6 is a longitudinal section of a part of the simpler modification of the sheet tester.

In describing my invention I will first describe my preferred form. In this description reference will be made to Figures 1, 4, 5, 8, 9, and 9a. Briefly I provide two sets of coils, positioned one above the other, with a conveyor belt 2 running through the upper set. (See Fig. 1.) In the form shown, I provide ten coils 31, five on each end of each set, which have only a primary winding 7, and which have a minimum total length of 15 inches per set. Between these two sets of five coils, I provide ten coils 32 having both a primary winding 7 and a secondary winding 8. At each end of the coil sets are the end pieces 1, which have a winding 26 on them.

A cross section of the ten intermediate coils 32, which have a primary and a secondary winding, is illustrated in Fig. 4, in which the primary winding is indicated by the numeral 7, the secondary winding at 8 and the conveyor at 2. There are two wear boards 11 placed under the conveyor belt 2 and below these boards is a compensating coil 9. The form members 10 in this figure are used to keep the wear boards and the conveyor belt in position and to protect the sides of the coils. The top wear board 12 is held in position by means of the strap 13 which projects through the solenoid and is fastened with the pin 14. In the Fig. 5 the numeral 15 indicates the center line of the coil, or solenoid.

These two sets of coils, placed one above the other, form the two legs "A" and "B" of my device as is readily seen in Fig. 9. The sheet 30 to be tested is placed in the upper set of coils or leg "A" by means of the conveyor belt 2 which is supported by the wear boards 11. This sheet 30 is so placed that it will contact the two end pieces 1 through wear boards 11. The auxiliary sheet 29 is placed in the lower set of coils or leg "B", and remains there contacting the end pieces 1, so that the two end pieces, the tested sheet, wear boards 11 and the auxiliary sheet form a closed magnetic circuit. It is to be observed that the auxiliary sheet 29 may remain in the leg "B" throughout the testing of all the sheets in an operation, or permanently if desired, and therefore there is no need of providing a conveyor for the handling of this sheet. A filler board 21 supports the auxiliary sheet 29 approximately on the axis of the solenoid.

The primary circuits of the solenoids are connected in parallel, although the ten center coils having a secondary circuit are run through the wattmeter 24, whereas the secondary circuits of these coils are connected in series to the voltmeters 25 and 25a and the secondary side of the wattmeter 24. The compensation coil connects to rectifier 27 and milli-voltmeter 23 through a knife switch. The two coils 26 on the end pieces 1 are shunted across the leads between the primary windings of the solenoids. This hook-up is more clearly illustrated in Fig. 8, which is a wiring diagram, and in which 19 indicates the bus bars, and the letters a, b, and c represent the different connections on the bus bars.

Figure 7:
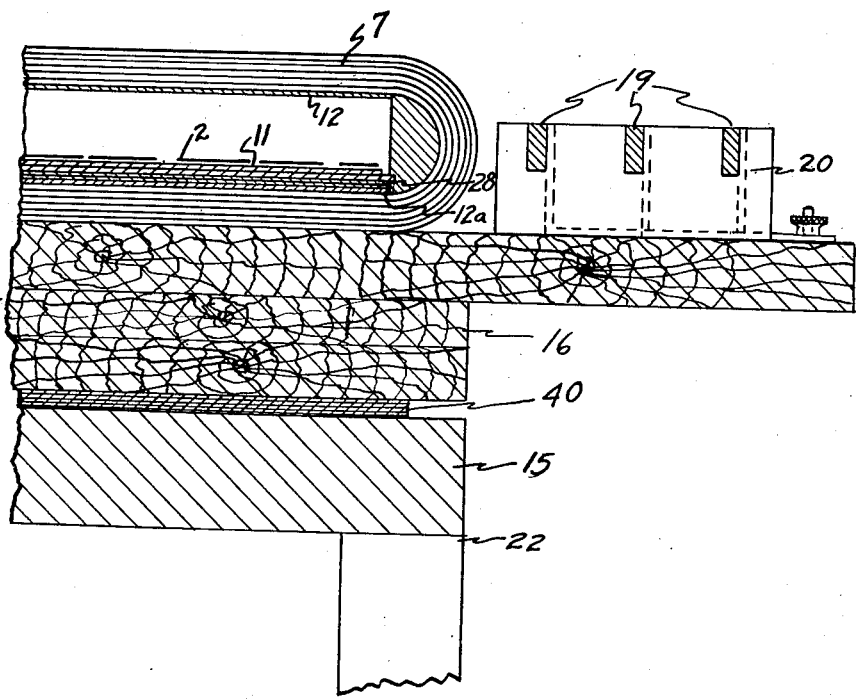
Figure 7 is a cross section of Figure 6, taken on the section line 7—7.

The simplified form of my invention which is useful in some circumstances, due to the smaller expense of construction and operation, is similar to my preferred type but lacks the lower set of coils, or leg "B". In place of this lower leg "B" I use a secondary leg or yoke 40 comprising a set of 10 or 12 sheets which contact the end pieces 1 and thus, with the test sheet, complete in effect, the magnetic circuit. Figs. 2, 3, 6, 7, and 10 are drawn to this simplified modification. Fig. 3 illustrates the set up of this simplified form. The conveyor belt 2 runs over the entering table 41 and the receiving table 42, between which is placed the base members 22 carrying the supports which hold the coil set 6 and the end pieces 1. There is a sheet guide and a solenoid guard 3 placed at the entering end of the coil set or tunnel 6; and there is a belt drive 4 and a belt cleaner 5. The apparatus support 15 also holds the supplementary pack of sheets or yoke 40. Referring to the Figs. 6 and 7, 15 represents the apparatus support and the pack or yoke 40 contacts the two end pieces 1 at a point below the test sheet which rides on the conveyor belt 2. 12 and 12a indicate the upper and lower wear boards, and 18 indicates the table top of one of the tables at the ends of the solenoid tunnel or set. The end pieces are held in position by the supports 17, and the cleats 16 determine the distance between the solenoid tunnel and the yoke 40. Running along the side of and parallel to the solenoid tunnel are the three bus bars 19 fastened into the insulating support 20. Below the conveyor belt 2 and the removable wear board, I may place one or more short supplementary sheets 28 of sheet width extending inward two coil lengths from each end piece, to assist in keeping the current in the coils adjacent the joint at a low value.

Fig. 10 indicates the wiring of the simplified form of my invention. The numerals 7 and 8 indicate the primary winding of the solenoids and the secondary winding. The ends of the secondary winding 48 and 49 are connected to terminals 48' and 49', in the upper part of the drawing of Fig. 10. The numerals 24 and 25 and 25a indicate the wattmeter and the voltmeters. The inductor 50 contains the external compensation coil which connects directly to the secondary windings 8 for core loss measurements or through a knife switch to rectifier 27 and meter 23 for permeability measurements. The numeral 52 indicates the dial box for the temperature compensator for the copper winding of the secondary circuit. The resistance boxes 51 correct for the high resistance of the secondary circuit. The power supply connects to switch 53.

The end members which complete the magnetic circuit are preferably made of selected materials of high permeability, and preferably will have sufficient mass to produce low magnetic reluctance. The construction may comprise sheets of silicon steel laid together face to face transversely of the end member, and disposed on edge vertically.

Having thus described my invention, what I claim as new and desire to secure by Letters Patent, is:

1. An apparatus for determining the core loss and permeability of metal sheets, comprising a coil having a primary winding, a secondary winding, and a compensation winding, end pieces positioned at the end of said coil so as to contact a sheet placed in the coil, windings on said end pieces connected in parallel with the primary windings of the coil, a number of secondary windings placed within the test section of the main coil and connected in series, a compensation winding placed within the test section of the main coil and connected in series with the secondary winding, but in opposite inductive relation thereto, a yoke connecting the ends of the end pieces together, a watt meter in series with the primary winding of the test section, said watt meter and a voltmeter shunted across the secondary winding and the compensation winding so that the core loss of said sheet may be determined, a rectifier and a millivoltmeter shunted across the compensation winding so that the permeability of a sheet placed in said coil may be determined by the reading of the millivoltmeter.

2. An apparatus for determining the permeability and the core loss of metal sheets, comprising two coils, primary windings on said coils in parallel with each other, secondary windings within one of said first mentioned coils in series with each other, shunted by a compensating coil within said last mentioned coil but wound around an axis other than that of said coils, said compensating coil being connected in series with said secondary windings and the watt meter and the voltmeter, said compensating coil being connected in opposite inductive relation to said secondary windings, means for sending a current through said primary windings, a metal pack in the coil having only primary windings, a metal sheet to be tested within the coil having secondary windings, end pieces connecting the ends of said pack and sheet together, said end pieces wound with a winding that is connected in parallel relationship with said primary windings, electrical indicating instruments connected to said secondary circuit so as to indicate sufficient data for the determination of the permeability and core loss of the metal sheet in one of said coils.

3. In an apparatus for measuring the magnetic properties of metal sheets, interspaced sheet members and interspaced magnetic bridging members, said members forming a closed magnetic circuit, a plurality of magnetizing windings surrounding one of said sheets, a plurality of secondary windings associated with the same sheet, said secondary windings being confined to a portion of said sheet characterized by uniform flux, and the magnetizing windings used in the measurement of said properties being confined to a number equivalent to that of the secondary windings.

4. A method of determining the magnetic permeability and core loss in a metallic sheet as such, which comprises causing said sheet to form part of a substantially closed magnetic circuit, inducing a magnetic flux in said sheet, and then calculating the magnetic properties of said sheet by the use of primary and secondary components derived only from that portion of the sheet characterized by uniform flux.

5. A method of determining the magnetic permeability and core loss in a metallic sheet as such, which comprises causing said sheet to form part of a substantially closed magnetic circuit, inducing a magnetic flux in said sheet, compensating for an unduly high electro-motive force induced due to flux in the air space adjacent said sheet, and then calculating the magnetic properties of said sheet by the use of primary and secondary components derived only from that portion of the sheet characterized by uniform flux.

6. An apparatus for determining the magnetic properties of metallic sheets as such, comprising a partial magnetic circuit adapted to be completed by at least a part of the sheet to be tested, and a coil structure through which said sheet is adapted to pass when in test position, said coil structure comprising a plurality of parallel connected primary coils for inducing a flux in the sheet, a secondary coil of a length at most coextensive with that portion of the sheet characterized by uniform flux, and compensating coils for neutralizing the unduly high electro-motive force induced to flux in the air gap adjacent the sheet, a portion only of said primary coils, coextensive with said secondary, being connected for test readings.

DANIEL T. GUNDERSEN.